United States Patent
Yoon

(10) Patent No.: US 9,350,606 B2
(45) Date of Patent: May 24, 2016

(54) SYSTEM AND METHOD FOR ASSIGNING SERVER TO TERMINAL AND EFFICIENTLY DELIVERING MESSAGES TO THE TERMINAL

(71) Applicant: SAMSUNG SDS CO., LTD., Seoul (KR)

(72) Inventor: Il-Jee Yoon, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 418 days.

(21) Appl. No.: 13/899,955

(22) Filed: May 22, 2013

(65) Prior Publication Data

US 2013/0318244 A1 Nov. 28, 2013

(30) Foreign Application Priority Data

May 22, 2012 (KR) .......... 10-2012-0053982

(51) Int. Cl.
*G06F 15/173* (2006.01)
*H04L 12/24* (2006.01)
*H04L 29/08* (2006.01)

(52) U.S. Cl.
CPC ........ *H04L 41/0806* (2013.01); *H04L 67/1023* (2013.01); *H04L 67/1034* (2013.01)

(58) Field of Classification Search
CPC ................... H04L 63/0407; H04L 63/0815
USPC ............... 713/155; 726/5; 709/203, 217, 219, 709/223, 224, 226, 228, 232, 238
See application file for complete search history.

(56) References Cited

U.S. PATENT DOCUMENTS 7,325,143 B2 * 1/2008 Wettstein ............ H04L 63/0407
713/155
8,887,250 B2 * 11/2014 Kuzin ................. H04L 63/0815
726/5

* cited by examiner

*Primary Examiner* — Quang N Nguyen
(74) *Attorney, Agent, or Firm* — Sughrue Mion, PLLC

(57) ABSTRACT

Provided are a server assignment and messaging system and method and a directory server. The server assignment and messaging system includes a plurality of connection servers configured to form a server group, and a directory server configured to generate at least one hash value for each of the plurality of connection servers using identification (ID) information of the respective connection servers and generate a logical server group in which the connection servers are arranged in a ring shape according to the generated hash values. The directory server is configured to receive a server assignment request from a terminal, and assign one of the plurality of connection servers included in the logical server group to the terminal using a hash value generated from ID information of the terminal and a server assignment rule.

30 Claims, 6 Drawing Sheets

SYSTEM AND METHOD FOR ASSIGNING SERVER TO TERMINAL AND EFFICIENTLY DELIVERING MESSAGES TO THE TERMINAL

CROSS-REFERENCE TO RELATED APPLICATION

This application claims priority to and the benefit of Korean Patent Application No. 10-2012-0053982, filed on May 22, 2012, the disclosure of which is incorporated herein by reference in its entirety.

BACKGROUND

1. Field

Exemplary embodiments disclosed herein relate to technology for effectively assigning a terminal to one of a plurality of connection servers and efficiently transferring a message to the terminal, and more particularly, to a server assignment and messaging system and method and a directory server.

2. Background of Related Art

With an increase in the use of mobile terminals such as smart phones, the structure of a server side for providing service to mobile terminals is gradually becoming large and complicated. In general, to transmit a message to a desired terminal, an entity in a specific network should find a connection server that is currently maintaining a connection with the terminal. To this end, the entity requests, from a database in which connection information is stored, information identifying the connection server connected with the terminal, and transmits the message to the connection server connected with the destination terminal using a result of the inquiry.

However, according to the technique of the related art, a number of access requests to access the database increases with an increase in the number of messages to be transmitted to terminals, and in this process, a severe bottleneck occurs.

SUMMARY OF THE EXEMPLARY EMBODIMENTS

The present disclosure is directed to providing a system and method for assigning a server to a terminal and efficiently messaging the terminal, and exemplary embodiments disclosed herein are capable of improving a processing speed by minimizing inquiries to a connection information database.

According to an aspect of an exemplary embodiment, there is provided a server assignment and messaging system including: a plurality of connection servers configured to form a server group; and a directory server configured to generate at least one hash value for each of the plurality of connection servers using identification (ID) information of the respective connection servers, and generate a logical server group in which the connection servers are arranged in a ring shape according to the generated hash values. Here, the directory server receives a server assignment request from a terminal, and assigns one of the plurality of connection servers included in the logical server group to the terminal using a hash value generated from ID information of the terminal and a server assignment rule.

According to another aspect of an exemplary embodiment, there is provided a directory server including: a logical server group generator configured to generate at least one hash value for each of a plurality of connection servers forming one server group using ID information of the respective connection servers, and generate a logical server group in which the connection servers are arranged in a ring shape according to the generated hash values; a receiver configured to receive a server assignment request from a terminal; a server assigner configured to generate a hash value from ID information of the terminal included in the server assignment request, and assign one of the plurality of connection servers included in the logical server group to the terminal using the generated hash value of the terminal and a server assignment rule; and a transmitter configured to transmit information identifying the connection server assigned by the server assigner to the terminal.

According to still another aspect of an exemplary embodiment, there is provided a server assignment and messaging method including: generating, at a directory server, at least one hash value for each of a plurality of connection servers forming one server group using ID information of the respective connection servers, generating a logical server group in which the connection servers are arranged in a ring shape according to the generated hash values; receiving, at the directory server, a server assignment request from a terminal; and assigning, at the directory server, one of the plurality of connection servers included in the logical server group to the terminal using a hash value generated from ID information of the terminal and a server assignment rule.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed exemplary embodiments will be described with reference to the drawings. However, the exemplary embodiments are merely examples and are not to be construed as limiting the present disclosure.

When it is determined that the detailed description of the known art related to the exemplary embodiments may obscure the gist of the exemplary embodiments, the detailed description thereof will be omitted. Terminology described below is defined considering functions in the exemplary embodiments and may vary according to a user's or operator's intention or usual practice. Thus, the meanings of the terminology should be interpreted based on the overall context of the specification.

The spirit of the present disclosure is determined by the claims, and the following exemplary embodiments are provided to efficiently describe the spirit of the present disclosure to those of ordinary skill in the art.

Figure 1:
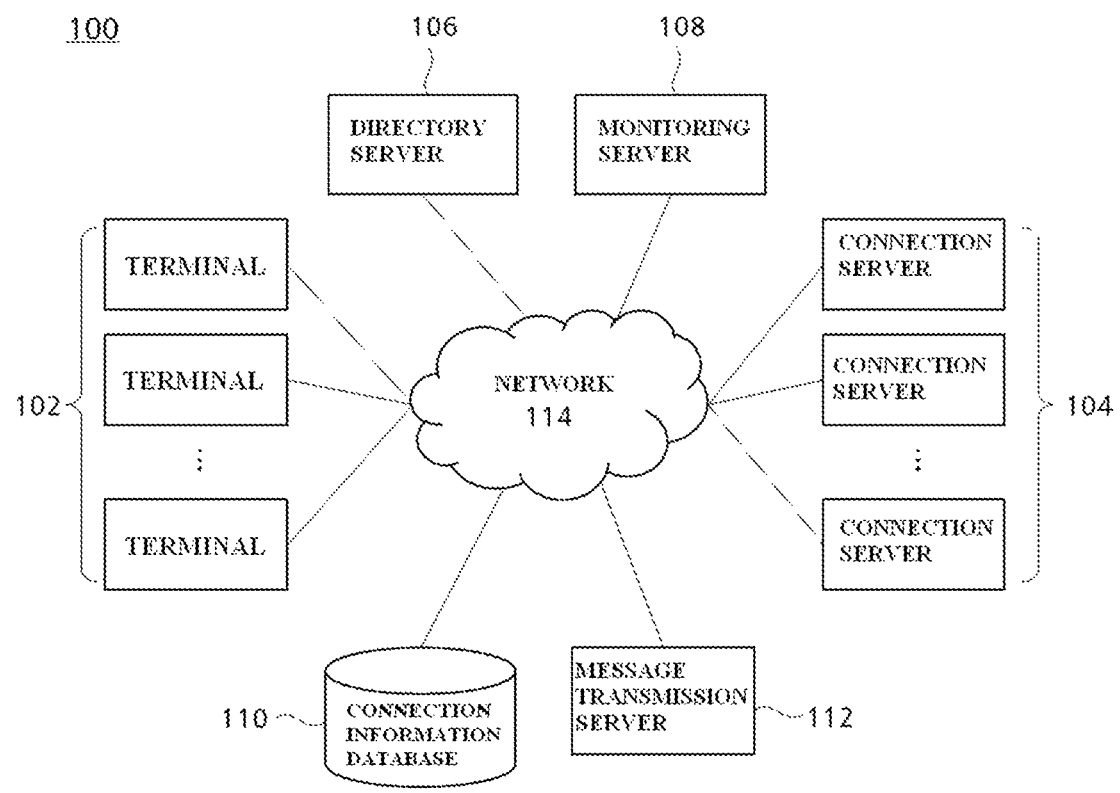
FIG. 1 is a diagram illustrating a server assignment and messaging system according to an exemplary embodiment.

FIG. 1 is a diagram illustrating a server assignment and messaging system 100 according to an exemplary embodiment. As shown in the drawing, the server assignment and messaging system 100 according to an exemplary embodiment includes terminals 102, a plurality of connection servers 104, a directory server 106, a monitoring server 108, a connection information database 110, and a message transmission server 112, and the respective components are connected with each other via a wired and/or wireless network 114 and exchange data.

Each of the terminals 102 is a component in the network 114 configured to receive a message from one of the plurality of connection servers 104 while maintaining a connection with the connection server 104. In an exemplary embodiment, the terminals 102 include mobile devices such as a mobile communication terminal, a smart phone, and a tablet personal computer (PC), and personal or portable user equipment such as a desktop or laptop computer. Also, in an exemplary embodiment, the terminals 102 do not necessarily denote devices on a client side, and the terminals 102 can also be implemented as an application server and other types of servers when a message is received from the connection servers 104.

The plurality of connection servers 104 are servers that are connected with the terminals 102 to relay a message to be transferred to the terminals 102. In an exemplary embodiment, a plurality of connection servers performing the same function are arranged in parallel and form one server group to provide smooth service to the plurality of terminals 102, and each of the terminals 102 establishes a connection to one of the plurality of connection servers 104 belonging to the server group according to a predetermined server assignment rule.

The directory server 106 receives a server assignment request from a terminal 102, and assigns one of the plurality of connection servers 104 to the terminal 102 according to the server assignment request. In other words, to be assigned a server, the terminal 102 first asks (e.g., transmits a request to) the directory server 106 requesting information about which connection server 104 the terminal 102 should connect to.

In the illustrated exemplary embodiment, the directory server 106 is shown separately from the plurality of connection servers 104, but these are merely functional classifications. In other words, the directory server 106 may be implemented as a computer device physically separated from the plurality of connection servers 104, or each of the plurality of connection servers 104 may serve as the directory server 106. Both of these configurations are included in the scope of the exemplary embodiments. In the latter case, the directory server 106 may be implemented as a component in the plurality of connection servers 104, and the terminal 102 may be assigned a server by transmitting the server assignment request to a randomly selected one of the plurality of connection servers 104.

The directory server 106 generates at least one hash value for each of the plurality of connection servers 104 using identification (ID) information of the respective connection servers 104, and generates a logical server group in which the connection servers 104 are arranged in a ring shape according to the generated hash values. It is understood that the connection servers may also be arranged in shapes other than ring shapes.

Figure 2:
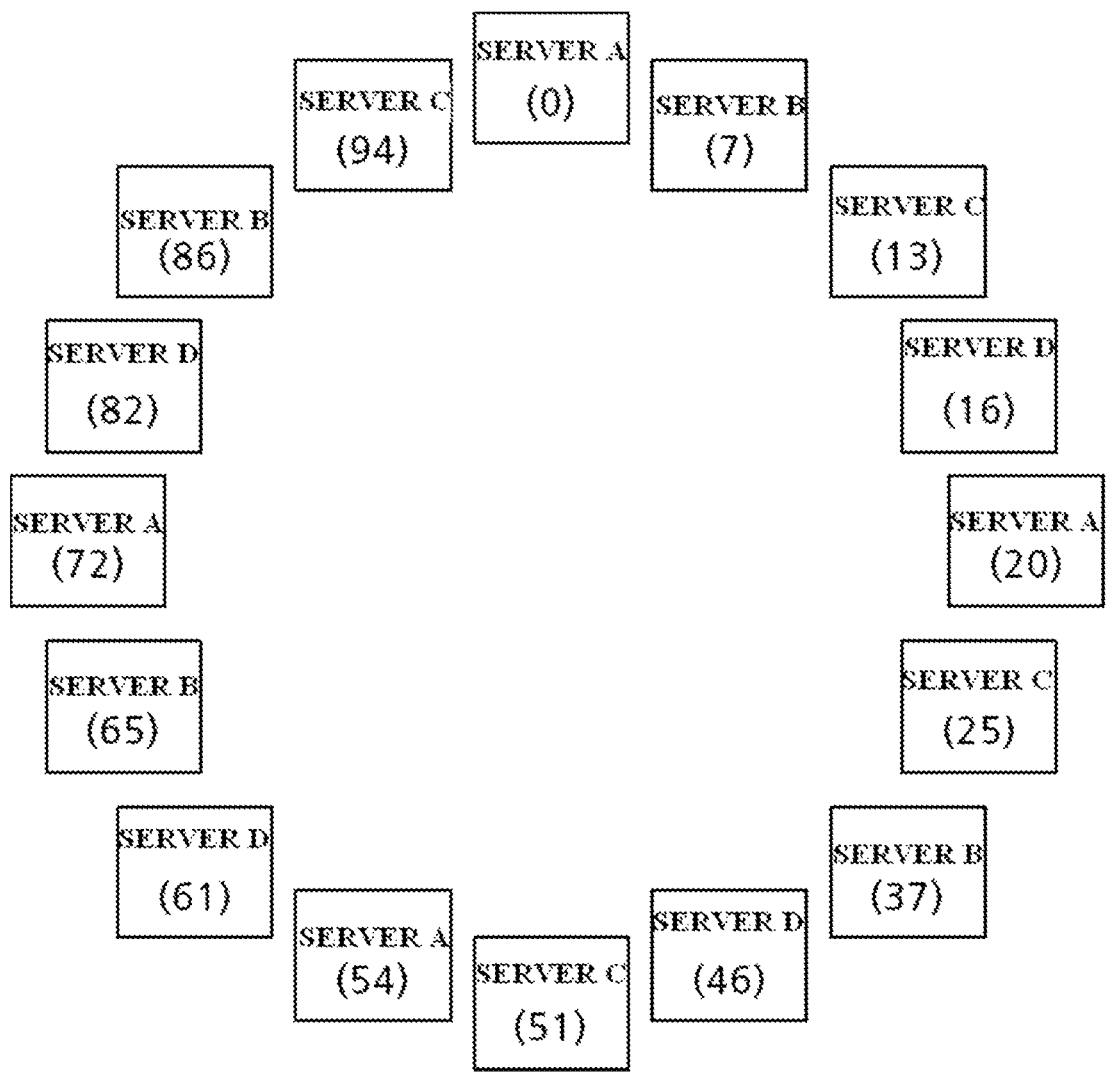
FIG. 2 is a diagram of an example of a logical server group generated according to an exemplary embodiment.

FIG. 2 is a diagram of an example of a logical server group generated according to an exemplary embodiment. Although the drawing shows an example in which the plurality of connection servers 104 includes four servers, that is, servers A, B, C, and D, the number of the connection servers 104 is not limited to this example, and there can be as many connection servers as needed.

A process in which the directory server 106 generates a logical server group is as follows.

First, the directory server 106 generates N (N is an integer equal to or greater than 1) hash values for each of the plurality of connection servers 104 using ID information of the respective connection servers 104. Here, the ID information of each of the plurality of connection servers 104 may be, for example, an Internet protocol (IP) address or media access control (MAC) address of the connection server 104. Also, the respective N hash values generated for each of the connection servers 104 may differ from each other.

For example, when hash values are generated using an IP address of each connection server, the following equation may be used.

$$\text{Hash value} = \text{Hash function}(\text{IP address of a server} + I,\ I = 1, \ldots, N)\quad \text{[Equation 1]}$$

In other words, respective values obtained by sequentially adding integers from 0 to N to an IP address of each connection server are hashed using the hash function, and thereby N hash values can be generated. However, the aforementioned hash value generation method is merely an example, and hash values can be generated using any method that satisfies the conditions of the user.

When N hash values are generated for each of the connection servers 104 using a method as described above, the directory server 106 arranges the plurality of connection servers 104 in a ring shape according to the generated hash values. For example, the directory server 106 may generate a logical server group such that the plurality of connection servers 104 are arranged in the ring in descending or ascending order of the calculated hash values. Here, each of the plurality of connection servers 104 is repeatedly arranged in the ring as many times as the number (N) of generated hash values.

For example, it is assumed that results of calculating four (N=4) hash values for each of the connection servers A, B, C, and D are as follows:

Server A: 0, 54, 20, 72
Server B: 37, 65, 7, 86
Server C: 94, 51, 13, 25
Server D: 16, 46, 61, 82

The four connection servers are arranged in a ring in ascending order of the hash values as shown in FIG. 2 (numbers in parentheses denote calculated hash values). As shown in FIG. 2, since four hash values are calculated for each connection server, each server is repeatedly shown in the logical server group four times.

After the logical server group is generated in this way, the directory server 106 receives a server assignment request from a terminal 102, and assigns one of the plurality of connection servers 104 included in the logical connection server to the terminal 102 using a hash value generated from ID information of the terminal 102 and a previously set server assignment rule.

For example, the directory server 106 may calculate the hash value (client-side hash value) by hashing an IP address or a MAC address of the terminal 102 included in the server assignment request received from the terminal 102.

The server assignment rule may be configured such that, for example, a connection server having the minimum hash value among connection servers having greater hash values than the hash value generated from the terminal 102 is assigned to the terminal 102, or a connection server having the maximum hash value among connection servers having smaller hash values than the hash value generated from the terminal 102 is assigned to the terminal 102. However, the aforementioned server assignment rules are merely examples, and it is possible to apply any rule for assigning a connection server according to ID information of a client.

For example, it is assumed that the hash value generated from the IP address of the terminal 102 is as follows.

Hash function(Client IP address)=22

When the server assignment rule is configured to assign a connection server having the minimum hash value among connection servers having greater hash values than the hash value generated from the terminal 102 to the terminal 102, a connection server having the minimum hash value among connection servers having greater hash values than 22 is server C having a hash value of 25 in FIG. 2, and thus, the directory server 106 assigns server C to the terminal 102, and transmits the resultant server assignment message to the terminal 102. Then, the terminal 102 receiving the server assignment message establishes a connection to server C.

Next, the monitoring server 108 (also referred to as a zookeeper) monitors operation states of the plurality of connection servers 104. When an operation state of at least one of the plurality of connection servers 104 changes, the monitoring server 108 notifies the other connection servers 104 belonging to the server group and the directory server 106 of the change. For example, when any one of the plurality of connection servers 104 stops operating and the terminal 102 cannot connect to the connection server 104, when a connection server 104 that has stopped operating starts operating again (e.g., it becomes possible to connect to the connection server 104), or when a new connection server is added, the monitoring server 108 notifies the plurality of connection servers 104 and the directory server 106 of the resultant information. Accordingly, the directory server 106 can receive information on which servers are currently operating in real time, and generates the logical server group based only on currently operating servers using the information. Also, when a change in the operation state of at least one of the plurality of connection servers 104 is received from the monitoring server 108 (e.g., when a specific server stops or starts operating, or a new server is added), the directory server 106 generates a logical server group again by causing a previously generated logical server group to reflect the change.

As mentioned above, since not all the plurality of connection servers 104 are always maintained in a connectable state in an exemplary embodiment, even if the directory server 106 assigns a connection server to a terminal 102, it may be impossible to connect to the connection server when the terminal 102 attempts to establish a connection to the assigned server. Accordingly, the directory server 106 may assign a terminal 102 one preliminary connection server in addition to one connection server. In this case, a server assigned according to the original server assignment rule may be referred to as a primary server, and a server to which a connection will be established when a connection to the primary server is impossible may be referred to as a secondary server.

The secondary server may be a server that is estimated to be assigned to the terminal 102 assuming that the primary server is not among the servers belonging to the logical server group. For example, when the hash value of the terminal 102 is 22 in the above-described exemplary embodiment, assuming that server C is not present, server B having a hash value of 37 is assigned. Thus, the directory server 106 may assign server C as a primary server, and server B as a secondary server.

However, such a secondary server assignment algorithm is only an example, and the exemplary embodiments are not limited to a specific secondary server assignment algorithm. When the primary server and the secondary server are assigned together in this way, the terminal 102 attempts to establish a connection to the primary server first, and establishes a connection to the secondary server when it is determined that establishing the connection to the primary server is impossible. Also, more than one secondary server may be assigned.

Next, the connection information database 110 is a database in which information of a terminal 102 is registered when the terminal 102 is successfully connected with one of the plurality of connection servers. In other words, a server connected with a terminal 102 stores information on the client terminal 102 connected with the server in the connection information database 110. Here, a connection server receiving a connection request from the terminal 102 among the connection servers included in the logical server group may be configured to determine whether the connection server itself is a primary server or a secondary server assigned to the terminal, and may register the terminal 102 with the connection information database 110 only when the connection server itself is the secondary server. In other words, each connection server belonging to the logical server group may calculate which server the terminal 102 should be actually connected to using the same algorithm as the directory server 106, and may know that the connection server itself is the secondary server when a server derived from the calculation is not the connection server itself. The exemplary embodiments enable each connection server to store connection information in the connection information database 110 only when a result of such a calculation indicates that the connection server is not a primary server, thereby reducing the amount of data in the connection information database 110 and reducing unnecessary network traffic. As mentioned above, according to exemplary embodiments connection information is stored only when a terminal 102 is connected to a secondary server because it is possible to easily calculate a connection server connection with the terminal 102 according to the server assignment rule without referring to the connection information database 110 when the terminal 102 is connected to the primary server normally.

Finally, the message transmission server 112 is a server for transmitting a message to a terminal 102. In an exemplary embodiment, the transmission server 112 may receive the message from another terminal transmitting the message, and transmit the message to the designated terminal. The message transmission server 112 may receive the message from the other terminal according to various techniques, for example, via a connection server connected with the other terminal. In this case, the message is transmitted from the transmitting terminal to the receiving terminal via the following route:

Transmitting terminal to Connection server connected with transmitting terminal to Message transmission server to Connection server connected with receiving terminal to Receiving terminal.

Alternatively, according to an exemplary embodiment, the message transmission server 112 may not be present as a separate hardware component in the network 114, but the respective connection servers 104 may also function as the message transmission server 112. In this case, the route may be configured as follows:

Transmitting terminal to Connection server connected with transmitting terminal to Connection server connected with receiving terminal to Receiving terminal.

In other words, the connection server 104 connected with the transmitting terminal can find a connection server connected with the receiving terminal using a previously set server assignment rule, and directly transfer the message to the connection server 104 connected with the receiving terminal.

The message transmission server 112 may receive a message from another server (e.g., application server, etc.) in the network 114 as well as the other terminal, and transmit the message to the terminal 102. In this case, a message transmission route is as follows:

Another server in network to Message transmission server to Connection server connected with receiving terminal to Receiving terminal.

Also, the message transmission server 112 can generate a message by itself and transmit the generated message to a terminal 102. In this case, a message transmission route is as follows:

Message transmission server to Connection server connected with receiving terminal to Receiving terminal.

To transmit a message to a terminal 102, the message transmission server should initially determine information identifying a connection server connected with the terminal 102. To this end, the message transmission server 112 finds a connection server estimated to be currently connected with the terminal 102 to which the message will be transmitted using the same logical server group generation rule and server assignment rule as the directory server 106, and transmits the message to be transmitted to the terminal 102 to the found connection server. Then, the connection server transmits the message received from the message transmission server 112 to the terminal 102.

According to exemplary embodiments, when the terminal 102 is not connected with the found connection server, or the connection server is in a state in which the connection server cannot receive a message, the following process can be performed.

First, the connection server may transmit a message indicating that the connection server cannot transmit a message transmitted from the message transmission server 112 to the terminal 102 because the connection server itself is not connected with the terminal 102, to the message transmission server 112. In this case, the message transmission server 112 searches for a connection server currently connected with the terminal 102 using connection information stored in the connection information database 110, and transmits the message to the connection server identified by the search. Likewise, according to exemplary embodiments, when the message transmission server 112 does not receive any response from the connection server for a previously set time, it may be determined that the connection server is in the state in which the connection server cannot receive and/or transmit a message.

Second, the connection server may be configured to search for a connection server currently connected with the terminal 102 by itself using connection information stored in the connection information database 110 and forward a message to the connection server identified by the search. In this case, a processing procedure is simplified compared to the first case.

In some cases, a connection server receiving a message from the message transmission server 112 may have information on another connection server currently connected with the terminal 102. In this case, it is possible to directly forward a message without searching for connection information stored in the connection information database 110. This will be described in detail with reference to FIG. 4.

Figure 3:
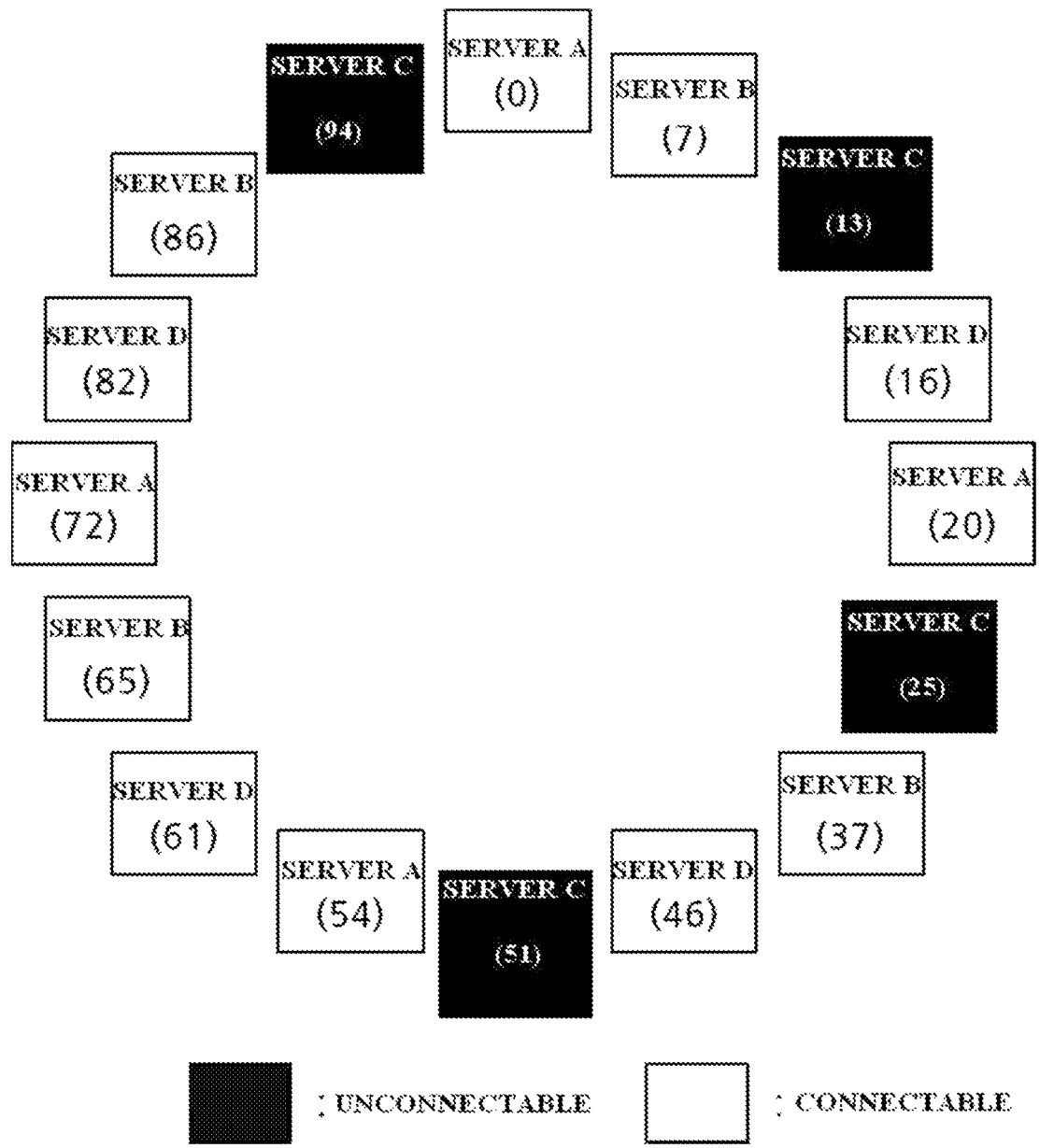
FIG. 3 is a diagram illustrating an example in which some of a plurality of connection servers are switched from a connectable state to an unconnectable state according to an exemplary embodiment.

FIG. 3 is a diagram illustrating an example in which some connection servers 104 are switched from the connectable state to the unconnectable state according to an exemplary embodiment. The exemplary embodiment in FIG. 3 shows an example in which server C is switched to the unconnectable state. The exemplary embodiment shows the example in which only one of the plurality of connection servers 104 is switched to the unconnectable state, but the same algorithm may be applied to a case in which at least two connection servers are switched to the unconnectable state.

When server C is switched to the unconnectable state as shown in the exemplary embodiment of FIG. 3, a terminal 102 assigned server C by the directory server 106 attempts to establish a connection to server C first. However, since, according to this example, establishing a connection to server C is currently impossible, the terminal 102 establishes a connection to a secondary server assigned with server C. For example, when a hash value of the terminal 102 is 47, the terminal 102 is assigned server C (hash value is 51) as a primary server and server A (hash value is 54) as a secondary server according to the above-described algorithm, and thus connects to server A which is the secondary server.

After a period of time, the directory server 106 generates a logical server group again to reflect the unconnectable state of server C, and server A naturally switches from being the secondary server to the primary server of the terminal 102. In other words, since the directory server 106 is configured to generate a logical server group again to reflect states of respective connection servers at previously set time periods, server C is removed from the re-generated logical server group when the corresponding time period passes, and server A becomes the primary server of the terminal 102. The time periods may be appropriately determined in consideration of characteristics of the connection servers.

Figure 4:
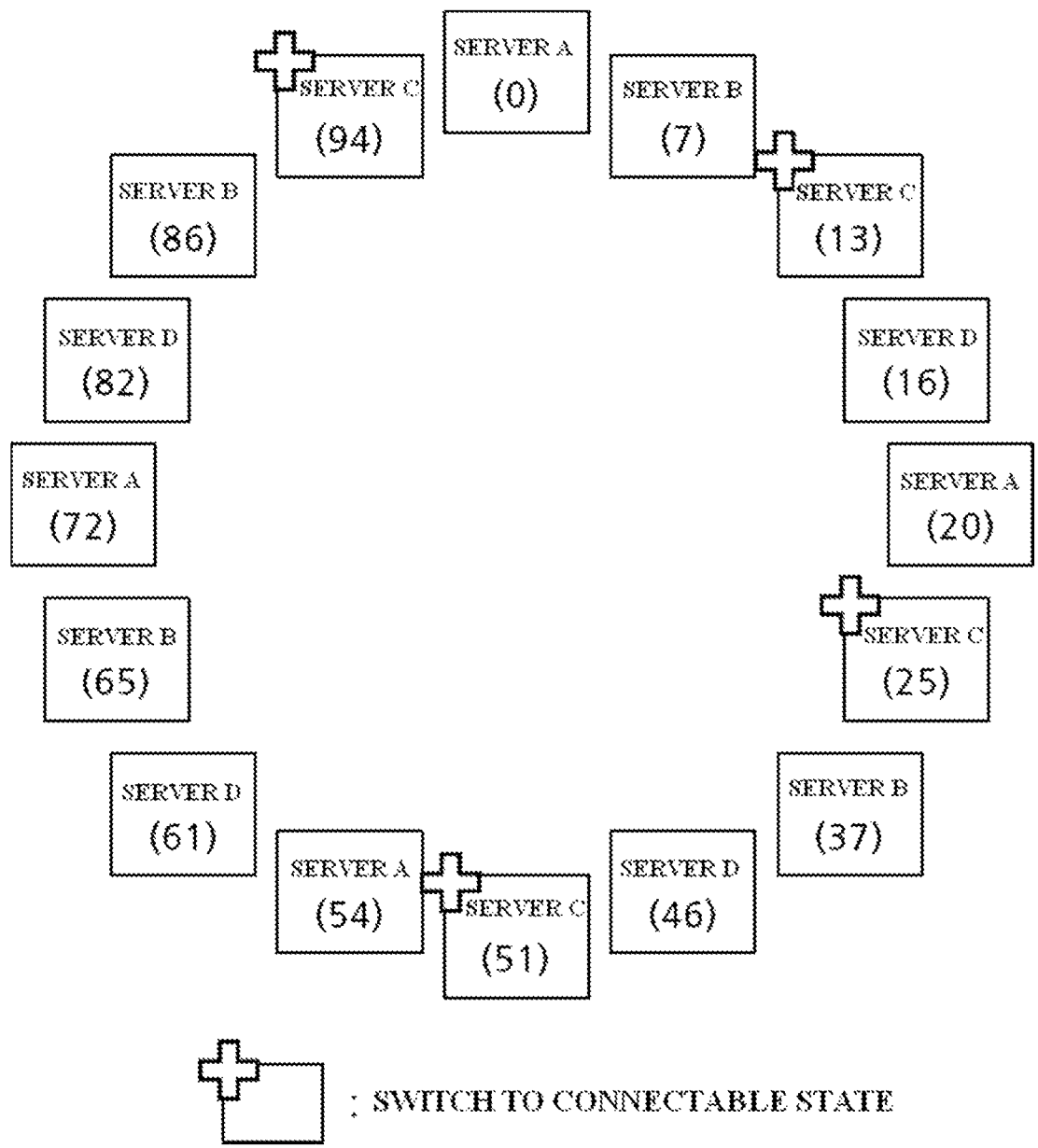
FIG. 4 is a diagram illustrating an example in which some of a plurality of connection servers are switched from the unconnectable state to the connectable state according to an exemplary embodiment.

FIG. 4 is a diagram illustrating an example in which some of the connection servers 104 are switched from the unconnectable state to the connectable state, or a new connection server is added, according to an exemplary embodiment. The exemplary embodiment shows an example in which server C is switched from the unconnectable state to the connectable state. The exemplary embodiment shows the example in which only one of the plurality of connection servers 104 is switched to the connectable state, or only one connection server is added, but the same algorithm may be applied to a case in which at least two connection servers are switched to the connectable state or added.

When server C is switched from the unconnectable state to the connectable state as shown in the exemplary embodiment of FIG. 3, there may be terminals that should connect to server C among terminals 102 connecting to other servers. For example, a terminal 102 having a hash value of 11 connects to server D (hash value is 16) in an environment in which server C is not capable of connecting with the terminal 102, but should connect to server C when it is possible to connect to server C. Thus, in this case, each connection server transmits a request for a connection change to a newly added connection server to a terminal 102 determined to be connectable to the added connection server among terminals 102 connecting to the connection server itself, such that the respective terminals 102 can be connected to normal primary servers.

When the respective connection servers simultaneously transmit the connection change request to terminals 102 connecting to the respective connection servers, requests for connections to a new server are made all at once, and network traffic may instantaneously and explosively increase. To prevent this, the respective connection servers may be configured to wait for delay times randomly selected within the range of a previously set maximum delay time, and then transmit the request for a connection change to a primary server to the terminals 102. For example, when the maximum delay time is one minute in the shown exemplary embodiment, servers A, B, and D may wait for 13 seconds, 32 seconds, and 52 seconds respectively, and then transmit the connection change request to terminals 102 connecting to the servers A, B, and D. In this way, traffic can be distributed over time.

Even before transmitting the connection change request, the respective connection servers may transmit connection information of clients determined to be connectable to a newly added connection server among the terminals 102 connecting to the connection servers to the added connection server. In this case, when a message transmitted to a terminal 102 that should be connected to the added connection server but has not yet been actually connected to the added connection server is received from the message transmission server 112, the added connection server may forward the received message to a connection server actually connected with the terminal 102 using information received from the connection server.

For example, the addition of server C may cause a terminal 102 connecting to server D in the drawing to connect to server C instead of server D. In this case, after a predetermined time elapses, server D requests a connection change to server C from the terminal 102. However, when there is a message to be transmitted from the message transmission server 112 to the terminal 102 before the connection change is made, the message is transmitted to server C according to updated logical server group information. To efficiently process this case, server D transmits information indicating that the terminal 102 is connected with server D itself before the connection change is made by the terminal 102. Accordingly, server C transfers the message received from the message transmission server 112 to server D such that the message can be transferred to the terminal 102.

Figure 5:
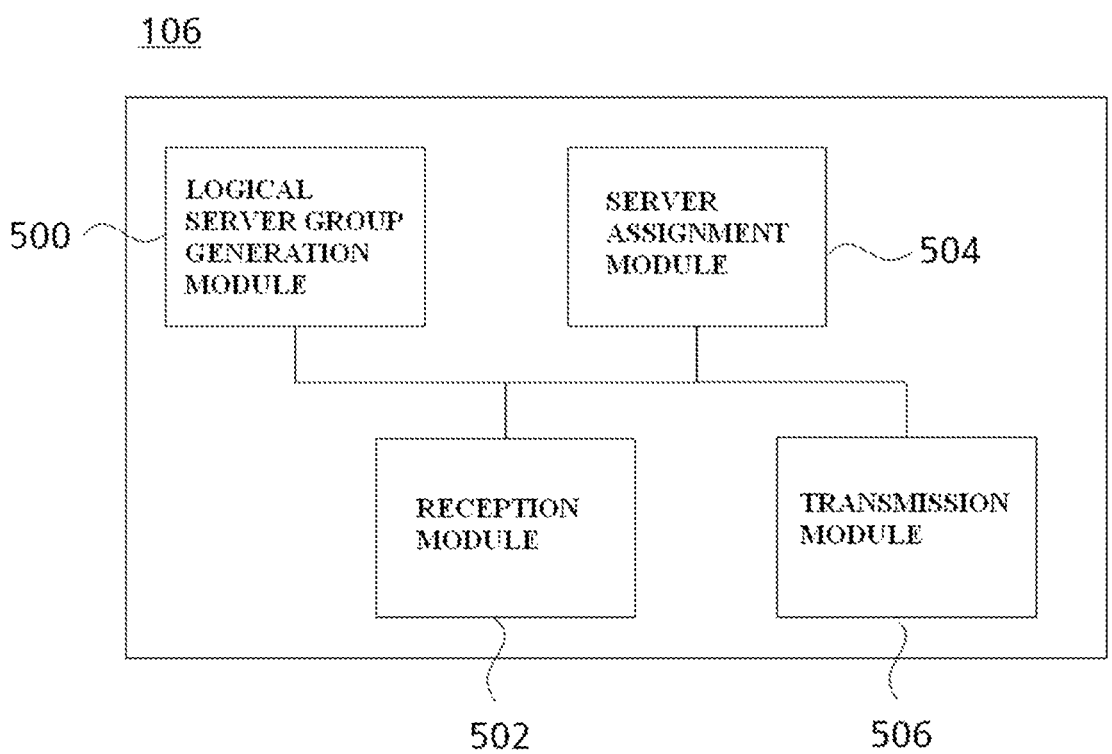
FIG. 5 is a block diagram of a directory server according to an exemplary embodiment.

FIG. 5 is a block diagram of the directory server 106 according to an exemplary embodiment. As shown in FIG. 5, the directory server 106 according to an exemplary embodiment includes a logical server group generation module 500 (e.g., logical server group generator), a reception module 502 (e.g., receiver), a server assignment module 504 (e.g., server assigner), and a transmission module 506 (e.g., transmitter).

The logical server group generation module 500 generates at least one hash value for each of the plurality of connection servers 104 forming one server group using ID information on the connection server, and generates a logical server group in which the plurality of connection servers 104 are arranged in a ring shape according to the generated hash values.

As described above, the logical server group generation module 500 may be configured to generate the logical server group such that the plurality of connection servers 104 are arranged in the ring in ascending or descending order of the calculated hash values. Also, each of the plurality of connection servers 104 is repeatedly arranged in the ring as many times as the number of the corresponding hash values.

In addition, the logical server group generation module 500 may receive current state information on the plurality of connection servers 104 from the monitoring server 108, etc., and generate the logical server group from only connection servers to which the terminal 102 can currently connect. Also, when an operation state of at least one of the plurality of connection servers 104 changes, the logical server group generation module 500 may generate the logical server group again to reflect the change.

The reception module 502 receives a request for assignment to one of the plurality of connection servers 104 from a terminal 102.

The server assignment module 504 generates a client hash value from ID information of the terminal 102 included in the server assignment request received from the terminal 102, and assigns one of the plurality of connection servers 104 included in the logical server group to the terminal 102 using the generated client hash value and a previously set server assignment rule.

The server assignment rule may be configured such that, for example, a connection server having the minimum hash value among connection servers having greater hash values than the hash value generated from the terminal 102 is assigned to the terminal 102, or a connection server having the maximum hash value among connection servers having smaller hash values than the hash value generated from the terminal 102 is assigned to the terminal 102. However, the aforementioned server assignment rule is merely an example, and the scope of the exemplary embodiments is not limited to a specific server assignment rule.

In addition to a primary server according to the server assignment rule, the server assignment module 504 may additionally assign the terminal 102 a secondary server to which a connection will be performed when a connection to the primary server is impossible.

Finally, the transmission module 506 transmits information of the connection server assigned by the server assignment module 504 to the terminal 102.

Figure 6:
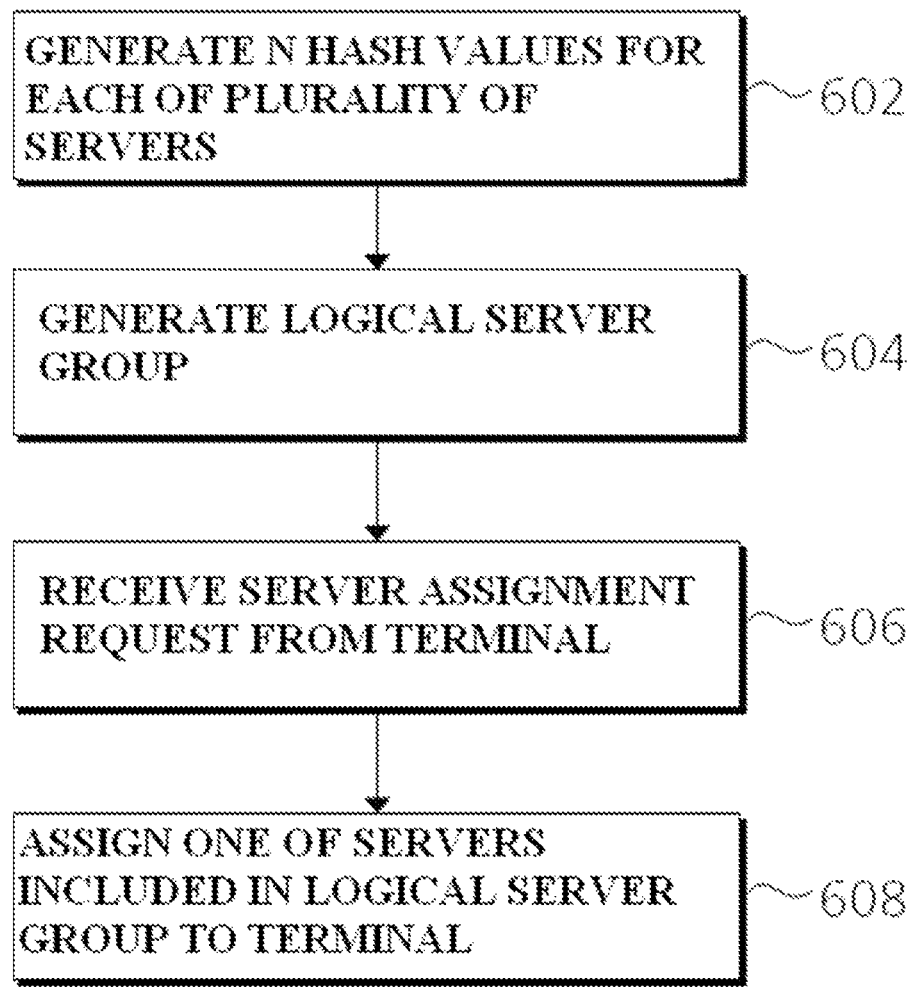
FIG. 6 is a flowchart illustrating a server assignment and messaging method of a directory server according to an exemplary embodiment.

FIG. 6 is a flowchart illustrating a server assignment and messaging method 600 of the directory server 106 according to an exemplary embodiment.

First, the directory server 106 generates N (N is an integer equal to or greater than 1) hash values for each of a plurality of connection servers 104 forming one server group using ID information of the connection server 104 (operation 602). Generation of the hash values has been described above, and the detailed description thereof will not be reiterated.

Next, the directory server 106 generates a logical server group in which the plurality of connection servers 104 are arranged in a ring shape according to the generated hash values (operation 604). In this operation, the logical server group may be configured such that the connection servers 104 are arranged in ascending or descending order of the calculated hash values. Accordingly, each connection server is repeatedly arranged in the ring as many times as the number of the corresponding hash values.

In addition, operation 604 may be configured to receive current state information of the plurality of connection servers 104 from the monitoring server 108, etc., and generate the logical server group from only connection servers to which a terminal 102 can currently connect. Also, operation 604 may be configured to, when an operation state of at least one of the plurality of connection servers 104 changes, generate the logical server group again to reflect the change.

Subsequently, the directory server 106 receives a server assignment request from a terminal 102 (operation 606). Although the flowchart in FIG. 6 illustrates that the directory server 106 generates the logical server group and then receives a server assignment request from a terminal 102, the directory server 106 does not have to receive a server assignment request from a terminal 102 after generating the logical server group, and operation 606 may be simultaneously performed with operations 602 and 604 or may be performed in advance of operations 602 and 604. In other words, irrespective of generation of the logical server group, the directory server 106 can receive a server assignment request from a terminal 102 anytime, and the scope of the exemplary embodiments includes all these cases.

Next, using a hash value generated from ID information of the terminal and a previously set server assignment rule, the directory server 106 assigns one of the plurality of connection servers 104 included in the logical server group to the terminal 102 (operation 608).

As described above, operation 608 may be configured such that the terminal 102 is assigned a primary server according to the server assignment rule and also a secondary server to which a connection will be performed when a connection to the primary server is impossible. Accordingly, the terminal 102 assigned the primary server and the secondary server from the directory server 106 attempts to establish a connection to the primary server first, and establishes a connection to the secondary server when it is determined that the connection to the primary server is impossible.

Exemplary embodiments of the present disclosure may be implemented as a computer-readable recording medium including a program for performing the methods described in this specification on a computer. The computer-readable recording medium may separately include program commands, local data files, local data structures, etc. or include a combination thereof. The medium may be specially designed and configured for the present disclosure, or known to those of ordinary skill in the field of computer software and available. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers.

According to exemplary embodiments, it is possible to remarkably reduce the number of times a database is accessed to obtain information on a connection server connected with a specific terminal. Thus, a bottleneck caused by database access can be removed, and the processing performance of an overall system can be improved.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A server assignment and messaging system, comprising:
a plurality of connection servers which forms a server group; and
a directory server comprising a processor coupled to a memory, the processor configured to generate at least one hash value for each of the plurality of connection servers using identification (ID) information of the respective connection servers, store the generated hash values in the memory, and generate a logical server group in which the connection servers are arranged in a ring shape according to the generated hash values,
wherein the directory server is configured to receive a server assignment request from a terminal, and assign one of the plurality of connection servers included in the logical server group to the terminal using a hash value generated from ID information of the terminal and a server assignment rule.

2. The server assignment and messaging system of claim 1, wherein the processor of the directory server is configured to generate the logical server group such that the connection servers are arranged in the ring shape in ascending or descending order of the generated hash values.

3. The server assignment and messaging system of claim 2, wherein the processor of the directory server is configured to generate the logical server group such that the connection servers are repeatedly arranged in the ring shape as many times as a number of hash values are generated for the respective connection servers.

4. The server assignment and messaging system of claim 1, wherein the server assignment rule is configured such that a connection server having a minimum hash value among connection servers having greater hash values than the hash value generated from the ID information of the terminal is assigned to the terminal, or a connection server having a maximum hash value among connection servers having smaller hash values than the hash value generated from the ID information of the terminal is assigned to the terminal.

5. The server assignment and messaging system of claim 1, further comprising a monitoring server configured to monitor operation states of the plurality of connection servers, and to notify, when an operation state of at least one of the plurality of connection servers changes, the other connection servers belonging to the server group and the directory server of the operation state change.

6. The server assignment and messaging system of claim 5, wherein, when the operation state change of the at least one of the plurality of connection servers is received from the monitoring server, the processor of the directory server is configured to generate another logical server group based on the operation state change.

7. The server assignment and messaging system of claim 6, wherein the processor of the directory server is configured to assign the terminal a primary server according to the server assignment rule and a secondary server to which a connection will be established when a connection to the primary server is impossible, and
the terminal is configured to attempt to establish a connection to the primary server first, and to establish a connection to the secondary server when it is determined that the connection to the primary server is impossible.

8. The server assignment and messaging system of claim 7, wherein, among the connection servers included in the logical server group, a connection server which receives a connection request from the terminal is configured to determine whether the connection server which receives the connection request is the primary server or the secondary server assigned to the terminal, and to register the terminal with a connection information database when the connection server which receives the connection request is the secondary server.

9. The server assignment and messaging system of claim 8, wherein the connection server which receives the connection request from the terminal is configured to determine whether the connection server which receives the connection request is the primary server or the secondary server according to whether or not the connection server which receives the connection request is a connection server assigned to the terminal according to the server assignment rule.

10. The server assignment and messaging system of claim 8, wherein, when a message indicating a change in the operation state of the primary server to a connectable state is received from the monitoring server, the secondary server connected with the terminal is configured to transmit a request for a connection change to the primary server to the terminal.

11. The server assignment and messaging system of claim 10, wherein the secondary server connected with the terminal is configured to wait for a delay time randomly selected within a range of a maximum delay time, and then transmit the request for the connection change to the primary server to the terminal.

12. The server assignment and messaging system of claim 10, wherein the secondary server connected with the terminal is configured to transmit information of the terminal to the primary server switched to the connectable state.

13. The server assignment and messaging system of claim 1, further comprising a message transmission server configured to calculate a connection server currently connected with the terminal according to the server assignment rule, and to transmit a message to be transmitted to the terminal to the calculated connection server.

14. The server assignment and messaging system of claim 13, wherein, when it is determined that the terminal is not connected to the calculated connection server, the message transmission server is configured to search for a connection server currently connected with the terminal using a connection information database.

15. The server assignment and messaging system of claim 13, wherein, when it is determined that the connection server receiving the message is not connected with the terminal, the connection server receiving the message is configured to search for a connection server currently connected with the terminal using a connection information database, and to forward the message to the connection server identified by the search.

16. A directory server, comprising:
a logical server group generator comprising a processor coupled to a memory, the processor configured to generate at least one hash value for each of a plurality of connection servers forming one server group using identification (ID) information of the respective connection servers, store the generated hash values in the memory, and generate a logical server group in which the connection servers are arranged in a ring shape according to the generated hash values;
a receiver configured to receive a server assignment request from a terminal;
a server assigner configured to generate a hash value from ID information of the terminal included in the server assignment request, and assign one of the plurality of connection servers included in the logical server group to the terminal using the generated hash value of the terminal and a server assignment rule; and
a transmitter configured to transmit information identifying the connection server assigned by the server assigner to the terminal.

17. The directory server of claim 16, wherein the processor of the logical server group generator generates the logical server group such that the connection servers are arranged in the ring shape in ascending or descending order of the generated hash values.

18. The directory server of claim 17, wherein the processor of the logical server group generator generates the logical server group such that the connection servers are repeatedly arranged in the ring shape as many times as a number of hash values are generated for the respective connection servers.

19. The directory server of claim 17, wherein the server assignment rule is configured such that a connection server having a minimum hash value among connection servers having greater hash values than the hash value generated from the ID information of the terminal is assigned to the terminal, or a connection server having a maximum hash value among connection servers having smaller hash values than the hash value generated from the ID information of the terminal is assigned to the terminal.

20. The directory server of claim 16, wherein the processor of the logical server group generator generates the logical server group from only connection servers to which the terminal can currently connect among the plurality of connection servers.

21. The directory server of claim 20, wherein, when an operation state of at least one of the plurality of connection servers changes, the processor of the logical server group generator generates another logical server group based on the operation state change.

22. The directory server of claim 16, wherein the server assigner assigns the terminal a primary server according to the server assignment rule and a secondary server to which a connection will be performed when a connection to the primary server is impossible.

23. A server assignment and messaging method, comprising:
generating, at a directory server, at least one hash value for each of a plurality of connection servers forming one server group using identification (ID) information of the respective connection servers;
generating a logical server group in which the connection servers are arranged in a ring shape according to the generated hash values;
receiving, at the directory server, a server assignment request from a terminal; and
assigning, at the directory server, one of the plurality of connection servers included in the logical server group to the terminal using a hash value generated from ID information of the terminal and a server assignment rule.

24. The server assignment and messaging method of claim 23, wherein generating the logical server group comprises generating the logical server group such that the connection servers are arranged in the ring shape in ascending or descending order of the generated hash values.

25. The server assignment and messaging method of claim 24, wherein generating the logical server group comprises generating the logical server group such that the connection servers are repeatedly arranged in the ring shape as many times as a number of hash values are generated for the respective connection servers.

26. The server assignment and messaging method of claim 23, wherein the server assignment rule is configured such that a connection server having a minimum hash value among connection servers having greater hash values than the hash value generated from the ID information of the terminal is assigned to the terminal, or a connection server having a maximum hash value among connection servers having smaller hash values than the hash value generated from the ID information of the terminal is assigned to the terminal.

27. The server assignment and messaging method of claim 23, wherein generating the logical server group comprises generating the logical server group from only connection servers to which the terminal can currently connect among the plurality of connection servers.

28. The server assignment and messaging method of claim 27, wherein, when an operation state of at least one of the plurality of connection servers changes, the generating the logical server group comprises generating another logical server group based on the operation state change.

29. The server assignment and messaging method of claim 23, wherein assigning the one server to the terminal comprises:

assigning, the terminal a primary server according to the server assignment rule and a secondary server to which a connection will be performed when a connection to the primary server is impossible; and attempting, at the terminal assigned the primary server and the secondary server, to establish a connection to the primary server first, and establishing a connection to the secondary server when it is determined that the connection to the primary server is impossible.

30. A non-transitory computer-readable recording medium storing a program which causes a computer to perform the operations of:

generating, at a directory server, at least one hash value for each of a plurality of connection servers forming one server group using identification (ID) information of the respective connection servers;

generating a logical server group in which the connection servers are arranged in a ring shape according to the generated hash values;

receiving, at the directory server, a server assignment request from a terminal; and assigning, at the directory server, one of the plurality of connection servers included in the logical server group to the terminal using a hash value generated from ID information of the terminal and a server assignment rule.

* * * * *